United States Patent [19]

Shepherd

[11] 4,451,162

[45] May 29, 1984

[54] SPACED BUTTON THRUST SURFACE FOR EARTH BORING BIT

[75] Inventor: William L. Shepherd, Houston, Tex.

[73] Assignee: Hughes Tool Company, Houston, Tex.

[21] Appl. No.: 389,782

[22] Filed: Jun. 18, 1982

[51] Int. Cl.³ ............................................. F16C 17/04
[52] U.S. Cl. .................................................. 384/95
[58] Field of Search .................... 384/95, 92, 303; 175/371; 384/420, 92; 308/4 A

[56] References Cited

U.S. PATENT DOCUMENTS

| T102,901 | 4/1983 | Offenbacher | 384/95 |
| 3,944,306 | 3/1976 | Neilson | 384/92 |
| 4,098,358 | 2/1977 | Klima | 175/65 |
| 4,190,301 | 2/1980 | Lachonius et al. | 384/95 |

Primary Examiner—Lenard A. Footland
Attorney, Agent, or Firm—Robert A. Felsman; James E. Bradley

[57] ABSTRACT

An earth boring bit has thrust surfaces with enhanced cooling features. The bit has a body with three depending bearing pins. A cutter having an axial cavity is mounted on each bearing pin. The bearing pin and the cavity have one or more mating thrust surfaces that are perpendicular to the axis of the bearing pin. These thrust surfaces absorb outward forces that the cutter imposes on the bearing pin. At least one of the thrust surfaces consists of a series of tungsten carbide buttons spaced in a circular array. These buttons have flat ends for engaging the opposite thrust surfaces. The buttons protrude from the supporting metal, allowing cooling fluid to be circulated past to cool the thrust surfaces.

4 Claims, 4 Drawing Figures

SPACED BUTTON THRUST SURFACE FOR EARTH BORING BIT

BACKGROUND OF THE INVENTION

This invention relates in general to earth boring bits, and in particular to surfaces in a bit for absorbing outward thrust of the cutter on the bearing pin.

Conventional earth boring bits have a body with three depending bearing pins, each of which receives a rotatable conical cutter. Journal or roller bearings between the cutter and bearing pin absorb large forces imposed on the bit during drilling. Normal downward drilling also causes the cutter to exert an outward force on the bearing pin, tending to push the cutter farther onto the bearing pin. This outward thrust is handled by one or more thrust surfaces located between the cutter and bearing pin in a plane perpendicular to the axis of the bearing pin. Usually these thrust surfaces have inlays of hard metal such as tungsten carbide to reduce the wear on the thrust surfaces.

One type of bit is particularly used in the mining industry for drilling blast holes of relatively short depth. Compressed air is pumped through the drill bit for cooling the bit and blowing cuttings to the surface. Some of the air is diverted through the bearing areas for cooling the bearings. Adequate cooling of the thrust surfaces and bearings is a long standing problem.

CROSS REFERENCE TO RELATED APPLICATION

This application is being filed concurrently with an application entitled "OPPOSED BUTTON THRUST SURFACES FOR EARTH BORING BIT", Ser. No. 389,781, filed June 18, 1982 inventor John M. Mullins.

SUMMARY OF THE INVENTION

Thrust surfaces are provided in this invention for providing enhanced cooling. The thrust surfaces are located within the cutter cavity, preferably at the nose of the bearing pin, and also at a shoulder located between the nose section of the bearing pin and the outer section of the bearing pin. A plurality of hard metal inserts or buttons are pressed into holes spaced in a circular array around these thrust surfaces. The holes are sized so that the buttons protrude outwardly from the supporting metal of the bearing pin. The buttons have flat surfaces that engage conventional inlays located in the cutter. The protruding, spaced-apart buttons allow the free circulation of air through the bearings and past the thrust surfaces.

DESCRIPTION OF THE PREFERRED EMBODIMENT

Figure 1:
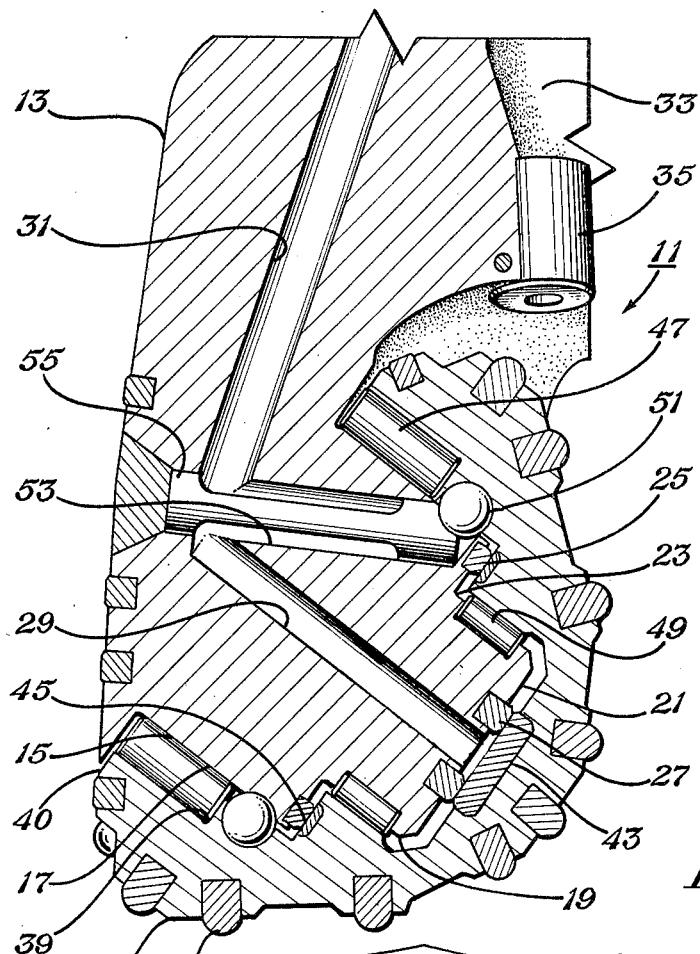
FIG. 1 is a vertical sectional view of a portion of an earth boring bit constructed in accordance with this invention.

Referring to FIG. 1, earth boring bit 11 has a body that includes three head sections 13 (only one shown). Each head section 13 has a depending bearing pin 15 integrally formed with it. Bearing pin 15 is a generally cylindrical member, having a cylindrical outer section 17 that joins head section 13. An inner section 19 of smaller diameter than the outer section 17 is formed on the free end of bearing pin 15. The extreme end 21 of bearing pin 15 is a flat surface perpendicular to the axis of bearing pin 15. An annular shoulder 23 is defined by the junction of the inner section 19 and outer section 17. Shoulder 23 is located in a plane parallel with the plane containing the bearing pin end 21.

Figure 2:
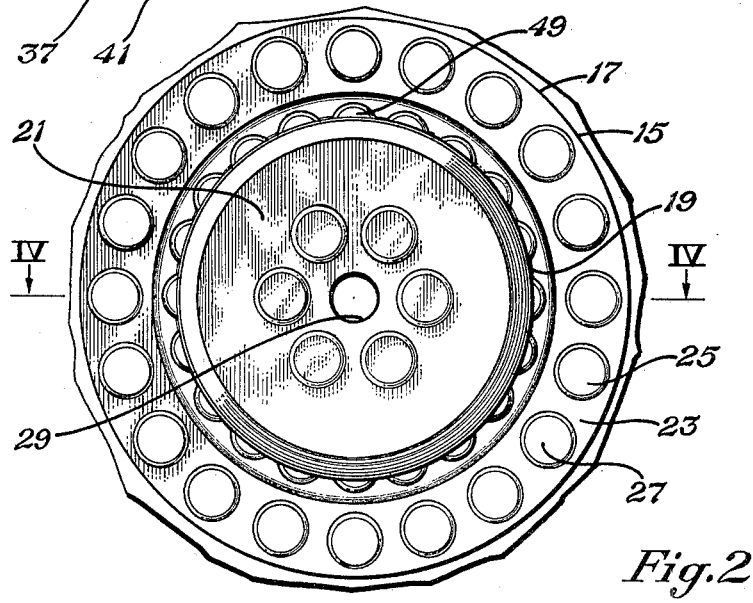
FIG. 2 is an end view of the bearing pin of the bit of FIG. 1, shown with the cutter removed.
Figure 4:
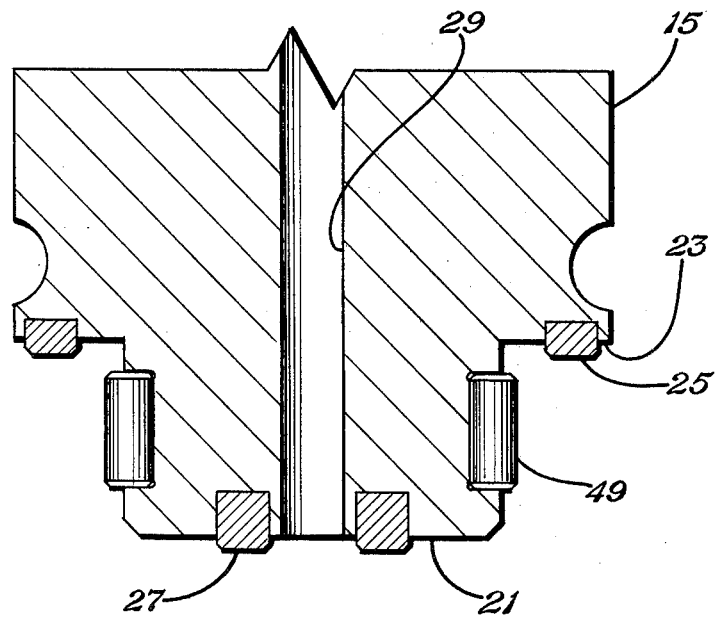
FIG. 4 is a sectional view of the bearing pin of the bit of FIG. 1, taken along the line IV—IV of FIG. 2.

A plurality of spaced-apart inserts or buttons 25 are located in the shoulder 23. As shown also in FIG. 4, each button 25 is a cylindrical member of hard, wear resistant material such as tungsten carbide. Each button 25 is preferably inteferingly pressed into a cylindrical hole drilled in the supporting metal of shoulder 23. The supporting metal will be of considerably less hardness than the buttons 25. The depth of the hole for each button 25 is less than the length of the button, causing each button to protrude from the surface of shoulder 23 a short distance. Each button 25 has a flat outer end that is located in the same plane that contains the outer ends of all of the other buttons 25. As shown in FIG. 2, each button 25 is spaced from adjacent buttons 25 a distance that is equal to about one half the diameter of the buttons. Buttons 25 define a thrust surface or shoulder for absorbing outward thrust imposed on bearing pin 15.

Referring again to FIG. 1, a plurality of buttons 27 are located in a circular array in the bearing pin end 21. Each button 27 is also an insert of hard metal such as tungsten carbide. Each button 27 is interferingly secured within a mating hole drilled in the supporting metal of bearing pin 15. The length of each button 27 is greater than the depth of the hole within which it is secured, causing it to protrude a selected distance past the surface of the bearing pin end 21. Each button 27 has a flat outer end that is located in a plane that contains all of the other outer ends of the buttons 27. Buttons 27 define a nose thrust surface for absorbing outward thrust imposed on bearing pin 15.

A passage 29 extends along the axis of bearing pin 15, with an outlet at the bearing pin end 21. Passage 29 joins a passage 31 which joins a central passage (not shown) located along the axis of bit 11. The central passage has three outlets 33, each containing a nozzle 35 for discharging air pumped down the outlets 33. Some of the air from the central passage passes through passages 31 and 29 to circulate through the bearing areas.

Each bearing pin 15 is adapted to receive a rotatable, generally conical cutter 37. Cutter 37 has a cavity 39 which fits over and is carried by bearing pin 15. Cavity 39 is axial, and is surrounded at its entrance by a backface. Backface 40 is spaced a selected distance away from the inside surface of the head section 13 and is not intended to engage the head section 13 in sliding contact. Cutter 37 is of a conventional type having elements for disintegrating the earth formation. These elements may be milled teeth, or tungsten carbide inserts 41 as shown.

Figure 3:
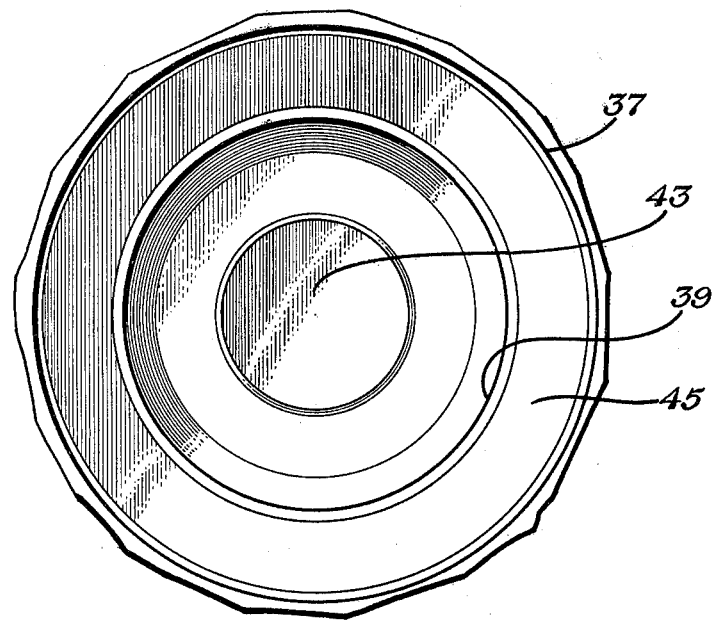
FIG. 3 is an end view looking inward to the cavity of the cutter of FIG. 1, with the bearing pin not shown.

A single, large disk or button 43 is located in the bottom of cavity 39 on the axis of cavity 39. Button 43 has a diameter that is selected so that it will slidingly engage the ends of the buttons 27. As shown in FIG. 3, the surface of button 43 is smooth and flat, defining a nose thrust surface for absorbing outward thrust.

Referring again to FIG. 1, cavity 39 has a small diameter and large diameter portion, divided by a shoulder that contains an annular inlay 45. Inlay 45 is of hard, wear resistant material such as tungsten carbide. Inlay 45 is normally deposited into a groove formed in the cavity 39 by a welding process. The surface of inlay 45 is smooth and flat, as shown in FIG. 3, for slidingly engaging the ends of the buttons 25. Inlay 45 is also a thrust surface for absorbing outward thrust.

The bit shown in FIG. 1 has bearing means that includes a set of roller bearings 47 mounted near the entrance to cavity 39. Roller bearings 47 are cylindrical bearings that engage the bearing pin outer section 17 in rolling contact. The outer ends of the roller bearings 47 are spaced a short distance from the inside surface of the head section 13 and are not intended to engage in sliding contact the head section 13. Bearings 47 are not intended to absorb axial or outward thrust.

The bearing means may also include a set of roller bearings 49 of smaller diameter than roller bearings 47. Bearings 49 are cylindrical and positioned in a race in the inner section 19 of bearing pin 15. Bearings 49 also engage in rolling contact the cavity 39 and the bearing pin 15.

Cutter 37 is retained on bearing pin 15 by means of a plurality of balls 51. Balls 51 lock the cutter 37 to the bearing pin 15 after the cutter has been inserted over the bearing pin. Balls 51 are placed within mating races by means of a passage 53. A retainer 55 in passage 53 holds the balls 51 in place. Passage 53 also transmits air from passage 31 to the bearings.

In operation, the bit 11 will be lowered into the hole and rotated, causing each cutter 37 to rotate about the axis of each bearing pin 15. Antifriction bearings comprising rollers 47 and 49 absorb downward thrust imposed on the bit 11. Outward thrust is absorbed by the sliding contact of button 43 with buttons 27, and the sliding contact of inlay 45 with buttons 25. Air pumped down the drill pipe will discharge through nozzle 35 and also pass through passages 31, 29 and into the spaces between the cutter 37 and bearing pin 15. The air will flow between the buttons 27, then change directions and flow outwardly. The air will pass through the spaces between the bearings 49 and the spaces between buttons 25. The air flows between the balls 51 and rollers 47 to discharge at the backface 40.

The invention has significant advantages. The spaced-apart buttons provide clearances for a large amount of air to flow through for cooling, thus prolonging the life of the thrust surfaces. Better wear resistance in the thrust surfaces increases the duration before the cutter is moved back into sliding contact with material in the head section that is less resistant to wear than the thrust surfaces. This increases the life of the bit.

While the invention has been shown in only one of its forms, it should be apparent to those skilled in the art that it is not so limited but is susceptible to various changes without departing from the scope of the invention.

I claim:

1. In an earth boring bit having a body with a depending bearing pin, a cutter having an axial cavity rotatably receiving the bearing pin, the bit having passage means for circulating air through spaces provided between the cutter and bearing pin, the bearing pin having at least one thrust surface perpendicular to the axis of the bearing pin that slidingly engages a thrust surface formed inside the cavity, at least one of the thrust surfaces comprising:
    a plurality of wear resistant tungsten carbide buttons interferingly pressed into mating holes formed in supporting metal, protruding therefrom, and engaging the opposite thrust surface in sliding contact.

2. In an earth boring bit having a body with a depending bearing pin, a cutter having an axial cavity that rotatably receives the bearing pin, the bit having passage means for circulating air through spaces provided between the cutter and bearing pin, the bearing pin having at least one thrust surface perpendicular to the axis of the bearing pin that slidingly engages a thrust surface formed in the cavity, one of the thrust surfaces comprising:
    a plurality of circular, wear resistant tungsten carbide buttons interferingly pressed into mating holes formed in a circular array in supporting metal, the buttons being longer than the depth of the holes so as to protrude from the supporting metal and allow air to be circulated between the buttons.

3. In an earth boring bit having a body with a depending bearing pin having a cylindrical outer section and a cylindrical inner section of lesser diameter, defining a thrust shoulder at the junction of the inner and outer sections that is perpendicular to the axis of the bearing pin, the end of the inner section having a thrust surface perpendicular to the axis of the bearing pin, the bit having a cutter with a cavity having a thrust shoulder that sliding engages the bearing pin thrust shoulder and a thrust surface that slidingly engages the bearing pin thrust surface, the bit having passage means for circulating air through spaces provided between the cutter and bearing pin, the improvement comprising:
    one of the thrust shoulders comprising a plurality of circular buttons of wear resistant tungsten carbide interferingly pressed in holes formed in supporting metal in a circular array and protruding from the shoulders; and
    one of the thrust surfaces comprising a plurality of circular buttons of wear resistant tungsten carbide material interferingly pressed in holes formed in supporting metal in a circular array.

4. In an earth boring bit having a body with a depending bearing pin having a cylindrical outer section and a cylindrical inner section of lesser diameter, defining at the junction of the inner and outer sections a thrust shoulder perpendicular to the axis of the bearing pin, the inner section having a thrust surface on its end that is perpendicular to the axis of the bearing pin, the bit having a cutter with a cavity having a thrust shoulder that slidingly engages the bearing pin thrust shoulder and a thrust surface in the bottom of the cavity that slidingly engages the bearing pin thrust surface, the bit having passage means for circulating air through spaces provided between the cutter and bearing pin, the improvement comprising:
    one of the thrust shoulders comprising a plurality of circular buttons of wear resistant tungsten carbide material interferingly pressed in holes formed in supporting metal in a circular array, the other of the thrust shoulders comprising an annular inlay of wear resistant material;
    one of the thrust surfaces comprising a plurality of circular buttons of wear resistant tungsten carbide material interferingly pressed in holes formed in supporting metal in a circular array, the other of the thrust surfaces comprising a single circular disk of wear resistant material;
    the buttons of the thrust shoulder and thrust surface being spaced apart and protruding from the supporting metal located between adjacent buttons to provide clearances between the buttons for the passage of the air.

* * * * *